Figure 1:
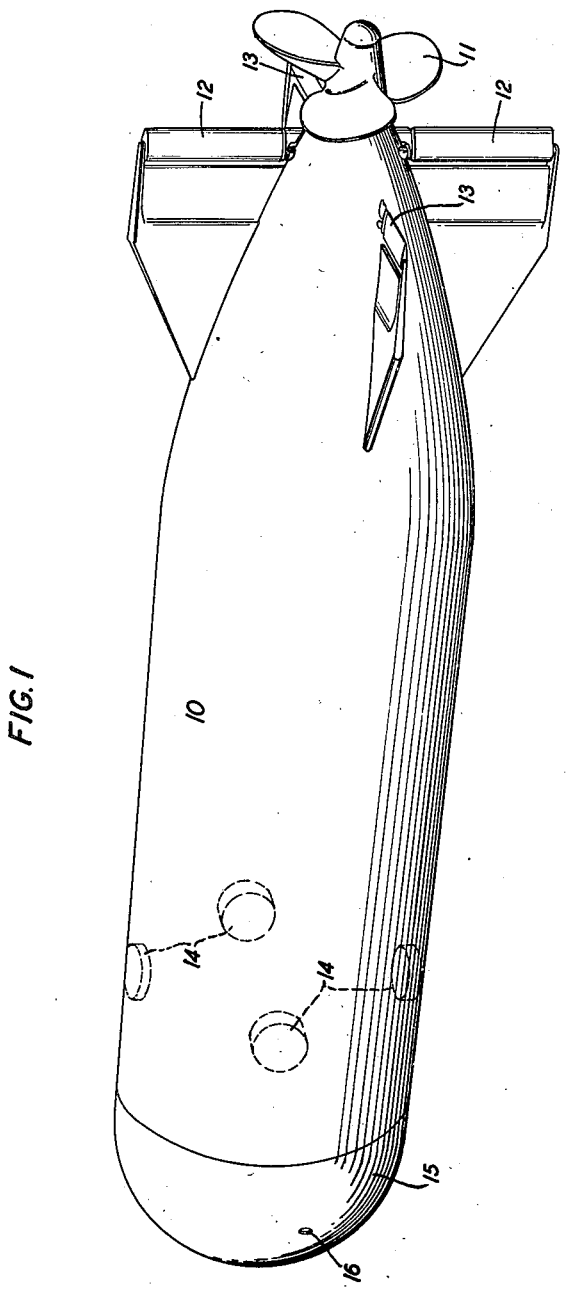

Patented June 25, 1946

2,402,617

UNITED STATES PATENT OFFICE 2,402,617

TESTING EQUIPMENT

Karl M. Fetzer, Rutherford, and Frederick A. Hoyt, East Orange, N. J., assignors to Bell Telephone Laboratories, Incorporated, New York, N. Y., a corporation of New York Application February 8, 1944, Serial No. 521,566

9 Claims. (Cl. 114—25)

This invention relates to testing equipment and more particularly to apparatus for the field testing of signal controlled steering systems for torpedoes such as disclosed in the application Serial No. 491,794, filed June 22, 1943 of Hugh K. Dunn.

In a signal guided torpedo of the type disclosed in the above-identified application, the rudder and elevator are controlled in accordance with the resultant of a number of control signals to guide the torpedo to and against a target. The control signals for the elevator include signals derived from and corresponding to sounds or noise emanating from the target, for example a submarine, and other signals determined by positional factors of the torpedo such as the depth of submersion thereof and its trim during the run thereof toward the target.

Because of the variety of factors involved in the operation of the steering systems for the torpedo, it is eminently desirable that the operation of the torpedo be checked before the torpedo is delivered for combat use. This may be done by subjecting the torpedo to one or more trial runs, with the normal explosive charge carried thereby removed, in which it is launched toward a submerged test target propagating submarine signals simulating those to which the torpedo is subjected in actual combat use.

One object of this invention is to enable the obtaining of information as to the motional behavior of a torpedo during a trial run thereof.

Another object of this invention is to prevent loss of a torpedo during a field test thereof.

In one illustrative embodiment of this invention, apparatus for the field testing of torpedoes includes a recorder having a stylus, and an actuating means for the stylus operable in accordance with a positional factor, for example depth, of the torpedo during the trial run thereof. The apparatus includes also a submarine signal projector, energizing means therefor and a control circuit which operates to render the projector energizing means effective under specified conditions of the torpedo. In one particular system, the control circuit is so constructed that it operates to cause energization of the projector whenever the main motor of the torpedo is inoperative and control elements are provided to render the main motor inoperative whenever the torpedo sinks to below a preassigned depth and also at the end of a preassigned period following the launching of the torpedo on the trial run thereof. The projector, when energized, emits a tone which can be detected by suitable apparatus at the sea surface or carried by a diver whereby the torpedo can be located readily.

Figure 2:
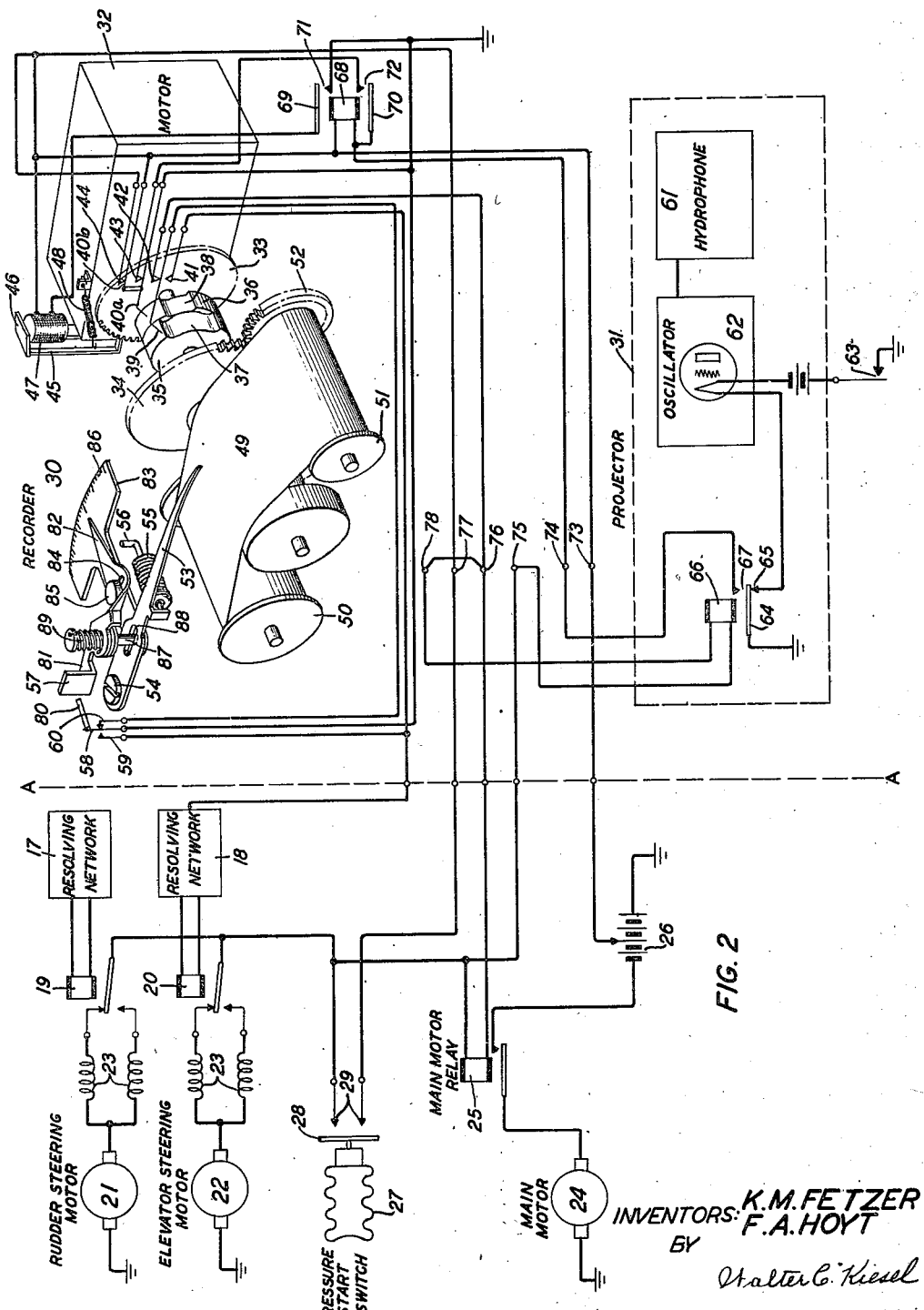

The invention and the various features thereof will be understood more clearly and fully from the following detailed description with reference to the accompanying drawings in which:

Fig. 1 is a perspective view of a torpedo having a signal controlled steering system, illustrative of the type to be tested by apparatus constructed in accordance with this invention; and Fig. 2 is in part an apparatus diagram and in part a circuit schematic showing torpedo testing equipment illustrative of one embodiment of this invention and the functional association thereof with the steering control system of the torpedo.

Referring now to the drawings, the torpedo illustrated in Fig. 1 comprises an elongated body 10 on which the propeller 11, rudder 12 and elevator 13 are mounted and in which the steering control system and the rudder, elevator and main motors are carried. Also mounted upon the body are hydrophones 14 arranged in horizontal and vertical pairs. Secured in water-tight relation to the body 10 is a head 15 in which the testing apparatus, to be described hereinafter, is mounted, the head having therein a port 16 the purpose of which will be pointed out hereinafter.

The steering control system, parts of which are illustrated to the left of the broken line A—A in Fig. 2, may be of the form disclosed in the hereinabove-identified application of Hugh K. Dunn and comprises a pair of resolving circuits 17 and 18 each of which is associated with a corresponding pair of the hydrophones 14 and has associated therewith a relay 19 or 20. Each resolving circuit is effective to convert the target signals detected at the corresponding pair of hydrophones, and auxiliary signals obtained as described fully in the application noted, into a control signal for operating the associated relay. Each relay controls the energizing circuit for a corresponding motor 21 or 22, the motors being of the reversible type and having two-part field windings 23 so arranged that the direction of rotation of the motor is determined by which part of the field winding is energized. The motor 21 is coupled to the rudder 12 by a suitable gear train and linkage and the motor 22 is coupled similarly to the elevator 13.

The main or propeller motor 24 is controlled by a relay 25. The several relays and motors are energized from a suitable source, such as a battery 26, the circuits involved being described in detail hereinafter.

Included in the circuits for the several motor relays is a pressure start switch comprising a bellows 27 the interior of which is in communication with a port, not shown, in the body 10 and which is of such construction that when the torpedo is submerged to at least a prescribed depth, the contact blade 28 coupled to the bellows engages the contacts 29.

The testing apparatus, which as noted heretofore is mounted in the head 15, is shown to the right of the line A—A in Fig. 2 and comprises a recorder, designated generally as 30, and a signaling element or projector designated generally as 31.

The recorder assembly includes a motor 32, which may be, for example, a spring type clock motor, having a driving shaft upon which a clutch gear 33, a driving gear 34 and a pair of timer cams 35 and 36 are mounted. The timer cams 35 and 36 are provided with detents 37 and 38, respectively, and control the operation of contact arms 39 and 40, respectively, with which contacts 41 and 42, and 43 and 44, respectively, are associated. Advantageously, the cams 35 and 36 are mounted adjustably upon the motor shaft so that the relative position of the detents 37 and 38 may be varied and these detents will be engaged by the contact arms 39 and 40 at a prescribed time interval after the motor 32 is started.

Associated with the gear 33 is a pawl or clutch 45 coupled to the armature 46 of a magnet 47, the pawl 45 being held in engagement with the gear by a spring 48 when the magnet is not energized and being disengaged from the gear by the action of the armature 46 when the magnet is energized.

The recorder assembly comprises also a recording roll 49 carried by spools 50 and 51 the latter of which is driven from the gear 34 by a gear 52. A stylus 53, for producing a trace upon the roll 49, is mounted upon a pivot 54 and is actuated by a bellows 55, the interior of which is coupled to the port 16 in the head 15 by a conduit or pipe 56 so that when the torpedo is submerged, the stylus moves in accordance with the hydrostatic pressure at the port 16 and, thus, produces a trace indicative of the depth of the torpedo.

Associated with the stylus and actuated in response to deflection thereof is a depth cut-off switch which comprises a spring contact arm 58 and a pair of contacts 59 and 60. The contact arm 58 is actuated by a push pin 80 adapted to be engaged by a finger piece 81 which is mounted on a pointer arm 82. The latter is carried by a plate 83 and is provided with an arcuate slot 84 through which a locking screw 85, threaded into the plate, extends. The plate, as shown, is provided with a scale 86 calibrated in terms of depth of submersion of the torpedo. The finger piece 81, pointer 82 and plate 83 are mounted suitably for movement as a unit in the direction of the longitudinal axis of the bellows, the unit being coupled to the stylus by a pin 87 which extends into an elongated slot 88 in the stylus.

Normally the contact arm 58 is in engagement with the contact 60. As the torpedo sinks, the bellows expands to deflect the stylus 53. As the stylus deflects, it causes displacement of the unit composed of the finger piece 81, arm 82 and plate 83 so that at a preassigned depth, determined by the setting of the arm 84, the finger piece engages the push pin 80 and the contact arm 58 is moved out of engagement with the contact 60 and into engagement with the contact 59.

If desired, a take-up spring connection 89 may be provided between the finger piece 81 and pin 87 to prevent substantial further motion of the finger piece after it engages the pin 80 to actuate the contact arms.

The projector 31 comprises a submarine signaling device 61, such as a hydrophone, which may be mounted upon a wall portion of the head 15, and an energizing element 62, such as an electronic oscillator, for the signaling device. One of the circuits of the oscillator, for example the cathode circuit as illustrated in Fig. 2, includes a manually operable switch 63 and the armature 64 and contact 65 of a relay 66. Normally, that is, when the relay 66 is not energized, the armature 64 is in engagement with the contact 65 and when the relay 66 is energized, the armature is disengaged from the contact 65 and moved into engagement with the contact 67.

Associated with the magnet 47 and relay 66 is a relay 68 having a pair of armatures 69 and 70 and contacts 71 and 72, respectively. The energizing current for relay 68 and also for the relays 25, 47 and 66 is obtained from the source 26 through circuits described hereinafter. The elements of the steering control system and of the testing equipment may be connected conveniently by way of a terminal strip having a plurality of terminals 73 to 78, inclusive, thereon.

The relays 25 and 66 have their windings connected in parallel across the terminals 75 and 76. The energizing circuit for these relays may be traced from ground at the battery 26, through the battery 26 to terminal 73, through contact arm 40b and the associated contact 44 to terminal 77, then across the contacts 29 by way of the blade 28 to one terminal of the relay 25 and from the other terminal of the relay to the terminal 76. The terminal 76 is connected to ground over the circuit traced from this terminal through contact 42, contact arm 39, contact 60, contact arm 58 and thence to ground.

The energizing circuit for the relay 68 may be traced from ground at the battery 26, through the battery to terminal 73, thence to one terminal of the relay 68 and from the other terminal of relay 68 to ground by way of the contact 67 and armature 64 of the relay 66. When the relay 68 operates, the armature 70 engages the contact 72 to complete a path to ground whereby the relay 68 is locked in.

Also when the relay 68 operates, the armature 69 engages the contact 71 to place a ground connection upon one side of the magnet 47 and thus completes the energizing circuit for the magnet 47.

The circuits for the rudder and elevator motors 21 and 22 may be traced from the armatures of the relays 19 and 20 across contacts 29 by way of the contact blade 28 to terminal 77 and thence to the battery 26 by way of contact 44, contact spring 40b and terminal 73.

The general operation of the system is as follows: Before the torpedo is launched upon its trial run, the clockwork motor 32 is wound, the cams 35 and 36 are adjusted to set the time desired for the run and the arm 82 is adjusted to set the finger piece 81 at such position that it will actuate the contact arm 58 at a preassigned depth of submersion of the torpedo. At this time, the several contacts and associated contact arms are in the positions shown in Fig. 2, that is, the contacts 29 are open, the contact of the main motor relay 25 is open, the armature 64 of relay 66 is in engagement with the contact 65, the contacts of relay 68 are open, the contact arm 39 is in engagement with the contact 42 and the contact arms 40a and 40b are in engagement with the contacts 43 and 44, respectively, and the contact arm 58 is in engagement with the contact 60. All the relays are deenergized. The switch 63 is then closed and the torpedo is launched. When the torpedo sinks to a preassigned depth, the pressure start switch operates, moving the blade 28 to bridge the contacts 29 thus closing the energizing circuits for the rudder and elevator motors 21 and 22 and the energizing circuits for the relays 25 and 26 over paths traced hereinabove. Operation of the relay 25 closes the circuit for the main motor, as is apparent. When the relay 66 operates, the cathode circuit of the oscillator 62 is opened so that the hydrophone is not energized. Also, when the relay 66 operates, the relay 68 is operated due to closure of the circuit therefor at the contact 67. As noted heretofore, the relay 68 locks in and closes the circuit for the magnet 47. Operation of the magnet 47 releases the pawl 45 and the motor 32 drives the recorder roll 49 and revolves the timer cams 35 and 36. If the torpedo remains above the depth limit set by the initial adjustment of the arm 34, the contact arm 58 remains in engagement with the contact 60 and the several motors continue operating until the cams have revolved through the previously determined arcs. At the end of this time, first the contact arm 39 falls into the detent 37 so that the circuits for the relays 25 and 66 are opened at the point 39, 42 and the main motor stops. At an interval thereafter, determined by the setting of the timer cams, the contact arm 40a falls into the detent 38 so that the elevator and rudder motor circuits are opened at 40b, 44 and the lock-in circuit for the relay 68 is opened at 40a, 43. The main circuit for this relay has already been opened at 66, 67 by opening of the circuit for the relay 66. Thus, the relay 68 releases and the magnet 47 also releases so that the pawl 45 engages the clutch gear to stop the motor 32. When the relay 66 releases, the cathode circuit for the oscillator 62 is closed at 64, 65 so that the hydrophone 61 is energized and emits a tone which enables location of the torpedo as described heretofore.

It will be noted that when the contact arm 39 is disengaged from the contact 42 it moves into engagement with the contact 41 and as a result a pulse is passed to the resolving network 18 over the circuit from ground to contact arm 58, thence to contact 60, contact arm 39 and contact 41 to the resolving network 18. Such connection of the network to ground results in up elevator and the torpedo is thus given an impetus toward the surface. Advantageously, the over-all weight of the torpedo is such that it has a slight positive buoyancy whereby, at the end of the trial run, it rises to the surface.

If, during the trial run, the torpedo should sink below the prescribed depth, the stylus 53 under the force applied thereto by the bellows 55 moves such distance that the finger piece 81 forces the contact arm 58 out of engagement with the contact 60 and into engagement with the contact 59. Closing of the contact 59 connects the resolving network 18 to ground over an obvious circuit so that the network produces up rudder signal as pointed out heretofore. Opening of the contact 60 opens the circuits for the relays 25 and 66 so that the main motor is stopped and the cathode circuit of the oscillator 62 is closed and the hydrophone 61 is energized to emit a tone which enables location of the torpedo. If the torpedo again rises above the prescribed depth, the stylus moves so that the contact arm 58 is disengaged from the contact 59 and engages the contact 60 whereby the circuits for the relays 25 and 66 are again closed and the circuit is restored to its initial operating condition.

It will be understood that throughout the period fixed by the initial setting of the timer cams 35 and 36, the recorder continues operating and the stylus 53, actuated by the bellows 55, produces upon the recording roll 49 a trace indicative of the depth of the path followed by the torpedo during the trial run thereof. The record thus produced provides information upon the basis of which the functioning of the elevator control system and the motional behavior of the torpedo can be gauged. It will be understood also that the oscillator 62 is rendered operative whenever the main motor 24 is not operating so that both at the end of the trial run and at any time during the trial run when the torpedo stops or sinks below the preassigned depth, the hydrophone 61 is energized to emit a signal which enables location of the torpedo and recovery thereof.

Although a specific embodiment of the invention has been shown and described, it will be understood that this embodiment is but illustrative and that various modifications may be made therein without departing from the scope and spirit of this invention as defined in the appended claims.

What is claimed is:

1. Apparatus for testing a torpedo having a propeller, means for driving the propeller and a control means for the driving means, said apparatus being adapted for mounting on the torpedo and comprising a recorder including a recording roll, means for driving said roll, a clutch for said roll driving means, a stylus and means for actuating said stylus in accordance with the depth of submersion of the torpedo, a signal projector, a control element for said projector, a timer element, means operatively associating said projector control element with said control means so that when said control means operates to render said propeller driving means operative said control element operates to render said projector inoperative and when said control means operates to render said propeller driving means inoperative said control element operates to render said projector operative, means actuated by said timer element for operating said control means to render said propeller driving means inoperative, means actuated by said timer element for operating said clutch to render said roll driving means inoperative, and means actuated by said stylus actuating means for operating said control means to render said propeller driving means inoperative whenever the torpedo sinks to below a prescribed depth.

2. Apparatus for testing a torpedo having a propeller and driving means therefor, said apparatus being adapted for mounting on the torpedo and comprising a recorder including a stylus, hydrostatically operated means actuated in accordance with the depth of submersion of the torpedo for actuating said stylus, a signaling device, energizing means for said device, and means for rendering said energizing means operative in response to cessation of operation of said propeller driving means.

3. Apparatus as defined in claim 2 comprising means actuated by said hydrostatically operated means for rendering said propeller driving means inoperative whenever the torpedo sinks below a preassigned depth.

4. Apparatus for testing a torpedo having a propeller, driving means for the propeller and a control circuit including a relay effective when energized to render said driving means operative, said apparatus being adapted for mounting on the torpedo and comprising a signaling device, a control circuit for said device including a second relay effective when energized to render said device inoperative, an energizing circuit common to said first and second relays, and control means for opening said energizing circuit in response to a preassigned position of the torpedo during a run thereof.

5. Apparatus in accordance with claim 4 wherein said control means comprises a first element for opening said energizing circuit whenever the torpedo rises above a preassigned level of submersion and a second element for opening said energizing circuit whenever the torpedo sinks below a second preassigned level of submersion.

6. Apparatus for testing a torpedo having a propeller, driving means for the propeller and control means for the driving means, said apparatus being adapted for mounting on the torpedo and comprising a signaling device, a relay effective when energized to render said device inoperative and effective when deenergized to render said device operative, a recorder, a driving motor therefor, a clutch for said motor, a second relay operable in response to energization of said first relay to release said clutch and render said motor operative, and means for operating said control means and said first relay in association so that when said control means operates to render said driving means operative said first relay is deenergized and when said control means operates to render said driving means inoperative said first relay is energized.

7. Apparatus as defined in claim 6 comprising means for operating said control means to render said driving means inoperative whenever the torpedo sinks below a prescribed depth.

8. Apparatus as defined in claim 6 comprising timer means actuated by said motor, and means actuated by said timer means for operating said control means to render said driving means inoperative.

9. In a signal guided torpedo, propelling means, control means for said propelling means, an elevator, actuating means for said elevator, a control circuit for said actuating means, means for operating said control means to render said propelling means inoperative whenever the torpedo sinks below a preassigned depth during a run thereof, and means responsive to operation of said operating means for impressing a signal upon said control circuit.

KARL M. FETZER.
FREDERICK A. HOYT.